United States Patent [19]

Hayashida et al.

[11] Patent Number: 4,568,092
[45] Date of Patent: Feb. 4, 1986

[54] LIP SEAL

[75] Inventors: Kunimatsu Hayashida, Weinheim; Hermann Rapp, Mörlenbach; Dieter Fuchs, Riedstadt, all of Fed. Rep. of Germany

[73] Assignee: Firma Carl Freudenberg, Weinheim, Fed. Rep. of Germany

[21] Appl. No.: 603,522

[22] Filed: Apr. 24, 1984

[30] Foreign Application Priority Data

May 3, 1983 [DE] Fed. Rep. of Germany ....... 3316063

[51] Int. Cl.$^4$ .............................................. F16J 15/32
[52] U.S. Cl. .................................... 277/152; 277/134
[58] Field of Search ................ 277/152, 153, 134, 154

[56] References Cited

U.S. PATENT DOCUMENTS

| 4,497,496 | 2/1985 | Repella | 277/152 |
| 4,501,431 | 2/1985 | Peisker | 277/152 |
| 4,522,328 | 6/1985 | Itölzer | 277/152 |
| 4,522,411 | 6/1985 | Burgan | 277/153 |
| 4,526,383 | 7/1985 | Fuchs et al. | 277/152 |

Primary Examiner—Robert I. Smith
Attorney, Agent, or Firm—Felfe & Lynch

[57] ABSTRACT

A seal comprises a disk flared to bear on a machine element to be sealed at two zones separated by an axial distance therealong has the machine element. The side of the flared disk along two hydrodynamically-acting back-feed elements which intersect each other.

16 Claims, 3 Drawing Figures

LIP SEAL

BACKGROUND OF THE INVENTION

The invention relates to a seal for a reciprocating or rotating machine element and, more particularly, a seal having a thin, flared disk bearing relatively movably on the machine element to be sealed.

A seal of this type is described in U.S. Pat. No. 3,250,541. The sealing lip disclosed in the patent consists of a thin, flared disk which is pre-curved in a direction to extend toward the space for liquid to be sealed in when installed for use and to bear elastically on the machine element which moves relative to it. The sealing lip, however, has only a very low mechanical rigidity. Proper installation is therefore possible only from the direction of the sealed space which, in many cases, poses great difficulties. Installation from the opposite side results in poor sealing action.

Published German Patent Application DAS No. 28 42 694 discloses a shaft sealing ring with a sealing lip secured to a reinforcing ring on the side toward the sealed medium and projecting axially toward the other side and the outside air. This seal can be installed readily from the outside, but the relatively-complex shape of the sealing lip and the garter spring required to give it adequate contact pressure make its manufacturing cost relatively high.

SUMMARY OF THE INVENTION

The object of the invention is, therefore, to improve a seal of the type outlined at the outset in such a way that good operating characteristics and, in particular, good running and sealing properties are obtained when the sealing lip projects toward the side facing away from the sealed space. Moreover, the seal should be easy to manufacture.

To these and other ends, the seal invention is used in a reinforcing ring for fixedly mounting one edge of the seal about a machine element which translates relatively through the reinforcing ring (e.g., reciprocates relative thereto) or rotates relative thereto generally about the axis of the reinforcing ring. The seal is an annular, at least somewhat elastic plate or disk. The edge fixed in the reinforcing ring projects generally radially inward for the seal to engage the machine element in the annular opening of the disk and, thus, form a seal about the machine element. At the outset, therefore, it will be appreciated that neither the reinforcing ring nor disk has to be rotationally symmetric, at least when relative translation is involved, but may be, instead, for example, adapted to the shape of the machine element to be sealed.

An arrangement, preferably a dog or lip, projecting substantially transversely from one side of the annular disk substantially at the other edge of the disk forms a guide surface. The side of the disk from which the lip projects has hydrodynamically-acting back-feed elements extending at least from the lip to a sealing surface section, as defined below, of the one side of the disk and, preferably, all thereacross. Hydrodynamically-acting back-feed elements are devices which, when the machine element moves relative to the seal, advance liquid away from the lip. The preferred hydrodynamically-acting back-feed elements are two helical grooves which intersect each other. In order to intersect each other, the grooves preferably have different pitches of the same sign (right or left handed helixes), the sign of the pitch from the lip, for example, not being essential to the invention but, if the machine element rotates relative to the seal, preferably being such relative to the rotation as would advance entrained, similarly-rotating liquid away from the lip. One of the grooves preferably has a deeper, triangular section, and the other a shallower, semicircular section.

To define the sealing surface section of the disk, the arrangement and dimensions of the disk relative to the machine element to be sealed are such that, at least when the seal is installed on the machine element, the disk curves or flares transversely from the radially-extending edge fixed in the reinforcing ring toward the lip edge. The lip bears on the machine element, thereat defining a guide surface, and, because the lip is transverse to the disk, pushes the lip edge of the disk away from the machine element sufficiently relative to the elasticity of the disk that the disk also bears on the machine element sealingly at a section of its lip side with the hydrodynamically-acting back-feed elements intermediate the edges of the disk and, thus, spaced from the lip at one edge of the disk. This is the sealing surface section.

In contrast to the seal described in U.S. Pat. No. 3,250,541, the seal of the invention exhibits excellent operating characteristics when it is installed in either direction, toward or away from the sealed space. In the opinion of the inventors, this surprisingly results largely from the hydrodynamically-acting back-feed elements on the inner, sealed-medium side of the flared disk in combination with the axial spacing between the sealing surface and the guide surface. This is, therefore, a basis of the invention, the lip structure for achieving it being, in this regard, merely a preferred embodiment.

The design of the hydrodynamically-acting back-feed elements is, therefore, one important factor. For this, it has proved advantageous to provide at least two, co-directional but intersecting helical back-feed elements and/or groups of back-feed elements which differ from each other in depth, profile, and/or pitch. The back-feed elements may be, for example, helical ribs and/or grooves which, preferably, intersect each other. The depth-of-profile and/or pitch ratio of the intersecting back-feed elements may range from 1:3 to 1:300 and preferably ranges from 1:50 to 1:100. Especially in the latter case, excellent sealing action is obtained with either a new seal or a seal that has been in use for a period of time. The profile of one is preferably symmetrical and parallel to the surface. The other is preferably unsymmetrical or angled with the surface of the disk to modify the flow pattern as may be important for preventing fouling with oil carbon, for example. Unsymmetrical design and/or angled surface alignment may also be important when back-feed elements have larger cross-sectional areas or spacings. The center line of angled back-feed elements such as appropriately-formed helical ribs and/or grooves make an angle with a plane tengentially on the surface of the disk thereat that ranges from about 25° to about 55° and preferably is 40°.

The other important factor in the seal of the invention, the axially-separated sealing and guide surfaces, is formed by a disk-transverse, inwardly-directed offset of a section of the disk, preferably the edge lip previously described. The cross-sectional area of the disk is not reduced over the space between the sealing and guide surface. This results in good stability of the relative alignment of the sealing and guide surfaces. Radial displacements of the sealed machine element due to shaft oscillations, for example, as the machine is started and stopped, therefore will not damage or disrupt the sealing surface. The guide surface further serves to keep wearing and fouling dirt away from the sealing surface.

BRIEF DESCRIPTION OF THE DRAWINGS

Preferred embodiments of seals which are intended to illustrate but not to limit the invention are shown in the accompanying drawings, wherein.

DESCRIPTION OF THE PREFERRED EMBODIMENTS

Figure 1:
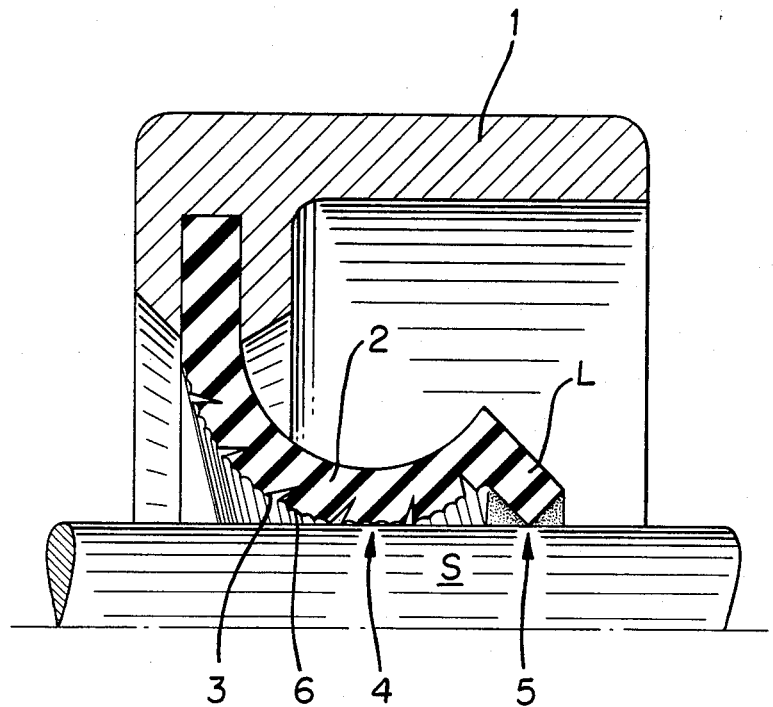
FIG. 1 is a half, sectional elevation of one preferred embodiment installed on one machine element.

The seal embodiment shown in FIG. 1 has a reinforcing ring 1 with which the seal is fixedly mounted in a machine. One edge of an annular, at least somewhat elastic disk 2 is fixed or bonded to the reinforcing ring, as shown, or integral therewith, for the disk to project radially inward of the reinforcing ring. The other edge of the annular disk 2 has a dog or lip L which projects substantially transversely from one side of the disk 2 (the plane of the disk if and when the disk were planar before installation) and substantially radially inwardly when installed and flared in the machine as shown in FIG. 1. Preferably, both the reinforcing ring and disk are plastic and, more preferably, polytetrafluoroethylene.

The disk flares from the edge in the reinforcing ring to bear elastically on a shaft machine element S (only half shown) having, for example, a diameter of 85 mm, at a first, sealing surface section at 4 at an axial or radially-transverse distance from the mounting position of the edge of the disk fixed in the reinforcing ring 1. The axial distance between the sealing surface at 4 and the mounting position is at least equal to the thickness of the disk 2, i.e. its dimension transverse to that between its annular edged.

The transverse arrangement or lip L is oriented so that the lip also bears on the shaft S when the seal is installed, as shown in FIG. 1. The part of the lip which bears on the shaft forms a guide surface at 5 for the seal on the shaft S. The guide surface at 5 on the lip is spaced from the sealing surface section 4.

The side of the disk which forms the sealing surface section at 4 and from which the lip L projects has hydrodynamically-acting back-feed elements (grooves 3 and 6) for pumping liquid which has leaked past the sealing surface section at 4 along the shaft from the side of the disk having the back-feed elements (the left in FIG. 1) toward the lip L back toward that side of the disk. The back-feed elements are formed by two helical grooves 3 and 6 which intersect each other.

Figure 2:
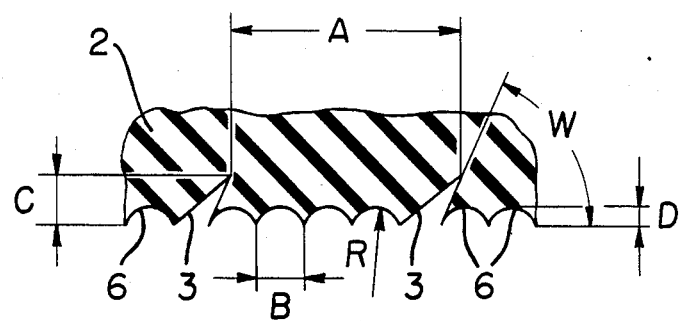
FIG. 2 is an enlarged, fragmentary section of the seal shown in FIG. 1.

At best shown in FIG. 2, groove 6 has a semicircular section with a radius R of 0.2 mm. The groove spirals across one side of the disk 2 to encircle the axis of rotation of the seal in the manner of a helix, the pitch B being 0.25 mm with a depth D of 40 microns.

Groove 3 has a triangular cross section, incised at an acute angle W of 40°, with a maximum depth C of 0.4 mm. The groove spirals across the same side of the disk 2 as groove 6, again to helically encircle the axis of rotation, the pitch A being 0.8 mm. The groove 6 is, therefore, continually intersected in its course by the groove 3.

The lip L forms the guide surface at 5 on the disk with a simple bend which, from a mechanical point of view, has a stabilizing effect and imparts good shape retention to the adjacent portions of the disk. The angles made by the sealed machine element and the sealing and guide surfaces in the various zones are therefore preserved even for an extended period of time which, obviously, is of considerable importance to good service properties.

Figure 3:
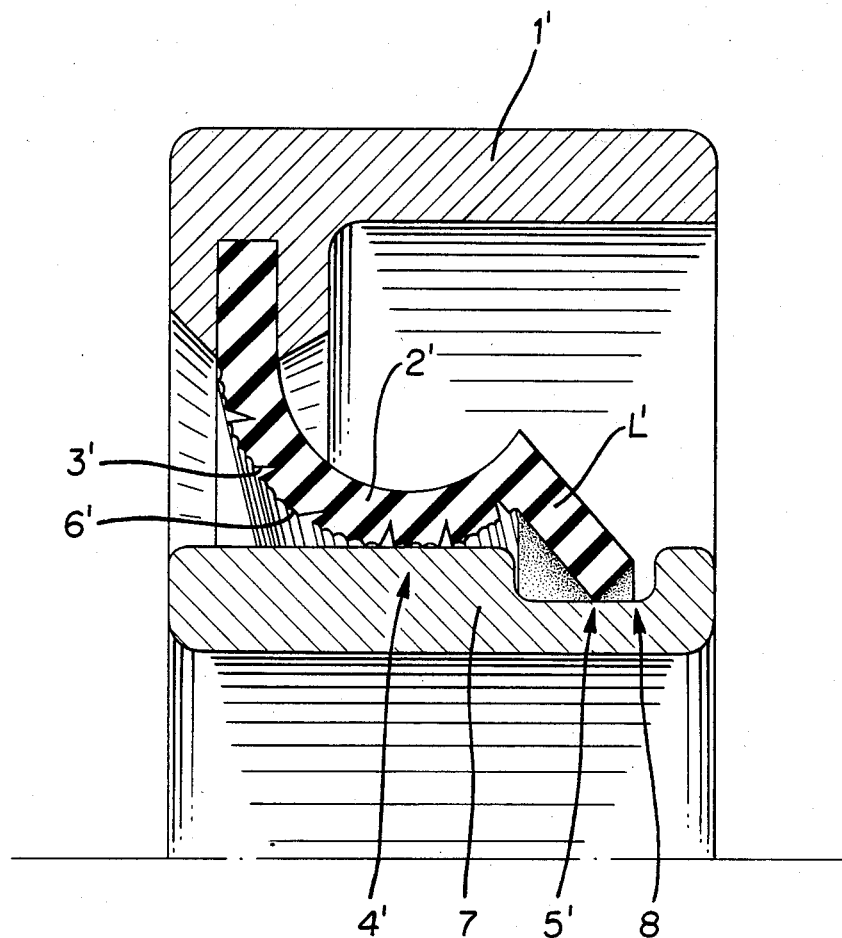
FIG. 3 is a half, sectional elevation of another preferred embodiment installed on another machine element.

FIG. 3 shows a similar seal with a longer lip L' for a guide surface projecting into a peripheral groove 8 in the sealed machine element 7 which, here, is a groove d, bushing.

Operation

No theory of operation of the seal is advanced, primarily because several rheological effects are believed to be involved, some of which depend upon the use of the seal with, for example, a rotating or translating machine element. It is believed, however, that some discussion of possible operation will aid in understanding the invention and its surprisingly-improved sealing results.

The two, spaced sealing-surface-section and guide-surface engagements of the disk with the machine element provide a double seal. The guide surface may thus keep dirt away from the sealing surface to reduce its wear and improve its sealing. The guide surface may also flex the disk with vibration or other motion parallel to the plane of the edge with which the disk is mounted in the reinforcing ring to maintain the sealing engagement of sealing surface section. The wedge shape between the disk and machine element at the side of the sealing surface section at 4 facing the space to the lip L may also capillarily hold a liquid barrier to further leakage.

The triangular groove 6 of the hydrodynamically-acting back-feed elements may capillarily draw in the liquid to be sealed which leaks to the sealing surface section and in the space between the sealing surface section and the guide surface. In the space, the liquid may be, for example, centrifugally thrown to the disk upon rotation of the machine element or wiped there by the lip and sealing surface upon translation. The liquid drawn in then does not leak past the guide surface. Also, when the guide surface then flexes the disk as described above, the liquid is squeezed from the groove 6 to the surface of the disk and the other groove 3.

The other groove 3 may then provide a surface affinity to the liquid rotated, wiped, or squeezed onto it. When this surface liquid reaches the lip, it may resist flowing onto the substantially transverse lip and, thus, may build across the disk surface from the lip to the sealing surface section until the pressure from the lip prevents further liquid from seeping past the sealing surface section or even forces liquid thereunder. The surface affinity of the groove 3 may also hold liquid at the sealing surface section and the wedge in the space toward the lip to augment the liquid barrier described above.

These and still other affects may effect the surprising sealing action of the invention.

It will be appreciated that the instant specification and claims are set forth by way of illustration and not of limitation, and that various changes and modifications may be made without departing from the spirit and scope of the present invention. For example, it should be understood that the reinforcing ring is not essential to the invention if, for example, the disk is mounted directly in a groove of the machine to have the seal.

What is claimed is:

1. A seal for a machine element reciprocating or rotating relative to a reinforcing ring about the machine element, comprising:
    an annular, at least somewhat elastic disk fixed at one edge to the reinforcing ring and projecting radially inward therefrom for sealing engagement about the machine element;
    means flaring the annular disk from the edge fixed in the reinforcing ring toward the other edge for sealingly engaging the machine element with one side of the disk, the means comprising a sealing surface section of the disk spaced from the edge fixed in the reinforcing ring transversely to the radial projection thereof and a guide surface farther so spaced from the sealing surface section; and
    hydrodynamically-acting back-feed elements on the one side of the disk at least over the space between the sealing surface section and the guide surface.

2. The seal of claim 1, wherein the hydrodynamically-acting back-feed elements comprise at least two, intersecting, helical elements having at least one of differing depth of profile and helical pitch.

3. The seal of claim 2, wherein the hydrodynamically-acting back-feed elements are co-directional helixes having relative pitches in a ratio of from about 1:3 to about 1:300.

4. The seal of claim 3 wherein the pitch ratio is from about 1:50 to about 1:100.

5. The seal of claim 2 wherein the guide surface comprises a lip transversely projecting from the one side of the disk having the hydrodynamically-acting back-feed elements near the other edge of the disk from the one fixed in the reinforcing ring.

6. The seal of claim 3 wherein the guide surface comprises a lip transversely projecting from the one side of the disk having the hydrodynamically-acting back-feed elements near the other edge of the disk from the one fixed in the reinforcing ring.

7. The seal of claim 4 wherein the guide surface comprises a lip transversely projecting from the one side of the disk having the hydrodynamically-acting back-feed elements near the other edge of the disk from the one fixed in the reinforcing ring.

8. The seal of claim 1 wherein the guide surface comprises a lip transversely projecting from the one side of the disk having the hydrodynamically-acting back-feed elements near the other edge of the disk from the one fixed in the reinforcing ring.

9. The seal of claim 7 wherein one of the hydrodynamically-acting back-feed elements comprises a helical groove having a generally circular section of a radius of about 0.2 mm., a depth of about 40 microns, and a pitch of about 0.25 mm.

10. The seal of claim 1 wherein one of the hydrodynamically-acting back-feed elements comprises a helical groove having a generally circular section of a radius of about 0.2 mm., a depth of about 40 microns, and a pitch of about 0.25 mm.

11. The seal of claim 9 wherein one of the hydrodynamically-acting back-feed elements comprises a helical groove having a triangular section, a maximum depth of about 0.4 mm, and a pitch of about 0.8 mm.

12. The seal of claim 1 wherein one of the hydrodynamically-acting back-feed elements comprises a helical groove having a triangular section, a maximum depth of about 0.4 mm, and a pitch of about 0.8 mm.

13. The seal of claim 11, wherein the center line of the triangular section forms an angle of from about 25° to about 55° with a plane tangentially on the surface of the one side of the disk at the section.

14. The seal of claim 12, wherein the center line of the triangular section forms an angle of from about 25° to about 55° with a plane tangentially on the surface of the one side of the disk at the section.

15. The seal of claim 13 wherein the angle is about 40°.

16. The seal of claim 14 wherein the angle is about 40°.

* * * * *